US008875028B2

(12) United States Patent  (10) Patent No.: US 8,875,028 B2
Samele et al.  (45) Date of Patent: Oct. 28, 2014

(54) USER COLLABORATION SYSTEM

(75) Inventors: Antonio Samele, Rome (IT); Timothy J. Schneider, Atlanta, GA (US)

(73) Assignee: Accenture Global Services Limited, Dublin (IE)

(*) Notice: Subject to any disclaimer, the term of this patent is extended or adjusted under 35 U.S.C. 154(b) by 1931 days.

(21) Appl. No.: 11/525,066

(22) Filed: Sep. 21, 2006

(65) Prior Publication Data

US 2008/0072158 A1 Mar. 20, 2008

(30) Foreign Application Priority Data

Sep. 15, 2006 (EP) .................................... 06425635
Sep. 15, 2006 (IT) .............................. MI2006A1768

(51) Int. Cl.
  *G06F 17/00* (2006.01)
  *G06Q 10/10* (2012.01)
  *G06F 3/048* (2013.01)
  *H04L 12/58* (2006.01)
  *H04L 12/18* (2006.01)

(52) U.S. Cl.
  CPC ............... *G06F 3/048* (2013.01); *G06Q 10/10* (2013.01); *H04L 12/588* (2013.01); *H04L 12/581* (2013.01); *H04L 12/1813* (2013.01); *H04L 51/04* (2013.01)
  USPC ........... 715/751; 715/758; 715/202; 715/204; 715/205; 715/219; 715/216; 715/224; 715/245

(58) Field of Classification Search
  CPC .... G06F 3/048; H04L 12/1813; H04L 12/588
  USPC .......... 715/751, 758; 709/204, 202, 205, 219, 709/216, 224, 245
  See application file for complete search history.

(56) References Cited

U.S. PATENT DOCUMENTS

| | | | | |
|---|---|---|---|---|
| 6,029,171 A | * | 2/2000 | Smiga et al. | 707/102 |
| 6,697,858 B1 | * | 2/2004 | Ezerzer et al. | 709/224 |
| 6,708,172 B1 | * | 3/2004 | Wong et al. | 707/10 |
| 7,058,897 B2 | * | 6/2006 | Matsuda | 715/758 |
| 7,088,814 B1 | * | 8/2006 | Shaffer et al. | 379/265.12 |

(Continued)

FOREIGN PATENT DOCUMENTS

WO  WO 2005/114383 A2  12/2005

OTHER PUBLICATIONS

Brodie, C., "ContactPoint: Helping Large Organizations Collaborate," Proceedings of the 2002 Symposium on Applications and the Internet, IEEE Comput. Soc., US, Jan. 28, 2002, pp. 51-58 (XP-010587863).

(Continued)

*Primary Examiner* — Cesar Paula
*Assistant Examiner* — David Faber
(74) *Attorney, Agent, or Firm* — Brinks Gilson & Lione (57) ABSTRACT

A user collaboration system providing for the efficient utilization of an organization's resources, such as the bandwidth associated with call center activity. At the same time, the user collaboration system enables users to quickly and easily receive help in a particular subject matter area, without requiring the user to know who within the organization may be able to provide that assistance. The user collaboration system also maintains an organization's user profile information that tracks employee subject matter expertise and allows users to request assistance from an anonymous expert. The assistance may be provided via a collaboration session which may be optimized based on available network resources.

23 Claims, 7 Drawing Sheets

| | Office of the Director | Remote Office | Technical Support Center | Customer Service Center | Warehouse | ... |
|---|---|---|---|---|---|---|
| Community 1 | 1 | 2 | 1 | 0 | 0 | 2 |
| Community 2 | 1 | 1 | 0 | 1 | 1 | 2 |
| Community 3 | 0 | 1 | 1 | 1 | 0 | 2 |

(56) References Cited

U.S. PATENT DOCUMENTS

| | | | |
|---|---|---|---|
| 7,321,919 B2 * | 1/2008 | Jacobs et al. | 709/205 |
| 7,519,683 B2 * | 4/2009 | Bodin et al. | 709/218 |
| 7,730,030 B1 * | 6/2010 | Xu | 707/617 |
| 7,818,407 B2 * | 10/2010 | O'Neal et al. | 709/221 |
| 2002/0053032 A1 * | 5/2002 | Dowling et al. | 713/201 |
| 2002/0073151 A1 * | 6/2002 | Rogers et al. | 709/204 |
| 2002/0075305 A1 * | 6/2002 | Beaton et al. | 345/751 |
| 2002/0091833 A1 * | 7/2002 | Grimm et al. | 709/227 |
| 2003/0028596 A1 * | 2/2003 | Toyota et al. | 709/204 |
| 2004/0085355 A1 * | 5/2004 | Harmes et al. | 345/751 |
| 2004/0174392 A1 * | 9/2004 | Bjoernsen et al. | 345/751 |
| 2004/0199635 A1 * | 10/2004 | Ta et al. | 709/226 |
| 2005/0198204 A1 * | 9/2005 | Takahashi | 709/219 |
| 2006/0143043 A1 | 6/2006 | McCallie, Jr. et al. | |
| 2006/0282303 A1 * | 12/2006 | Hale et al. | 705/10 |
| 2007/0030824 A1 * | 2/2007 | Ribaudo et al. | 370/328 |
| 2007/0130256 A1 * | 6/2007 | Moore et al. | 709/204 |

OTHER PUBLICATIONS

Riemer, K. et al., "Presence-based, Context-sensitive Real-Time Collaboration (RTC)—research directions for a new type of e-Collaboration system," [online], [retrieved on Jun. 7, 2006]. Retrieved from the Internet: URL:http://ecom.fov.uni-mb.si/proceedings; pp. 1-16 (XP-002416986).

European Search Report dated Jan. 26, 2007, for corresponding European Patent Application No. 06425635.7.

* cited by examiner

USER COLLABORATION SYSTEM

PRIORITY CLAIM

This application claims the benefit of EPO Application No. 06425635.7, filed Sep. 15, 2006 and Italian Application No. MI2006A001768, filed Sep. 15, 2006, both of which are incorporated herein by reference in their entirety.

BACKGROUND OF THE INVENTION

1. Technical Field

This invention relates to user collaboration systems. In particular, this invention relates to a flexible and independent collaboration system between users having particular skill sets.

2. Related Art

Rapid advances in data processing and telecommunications technology have lead to a vast array of communication services available to the consumer. Such telecommunication services include traditional telephone service, Internet service, cable television service, cellular phone service, paging service, combined voice and data delivery service, and many other services.

Figure 1:
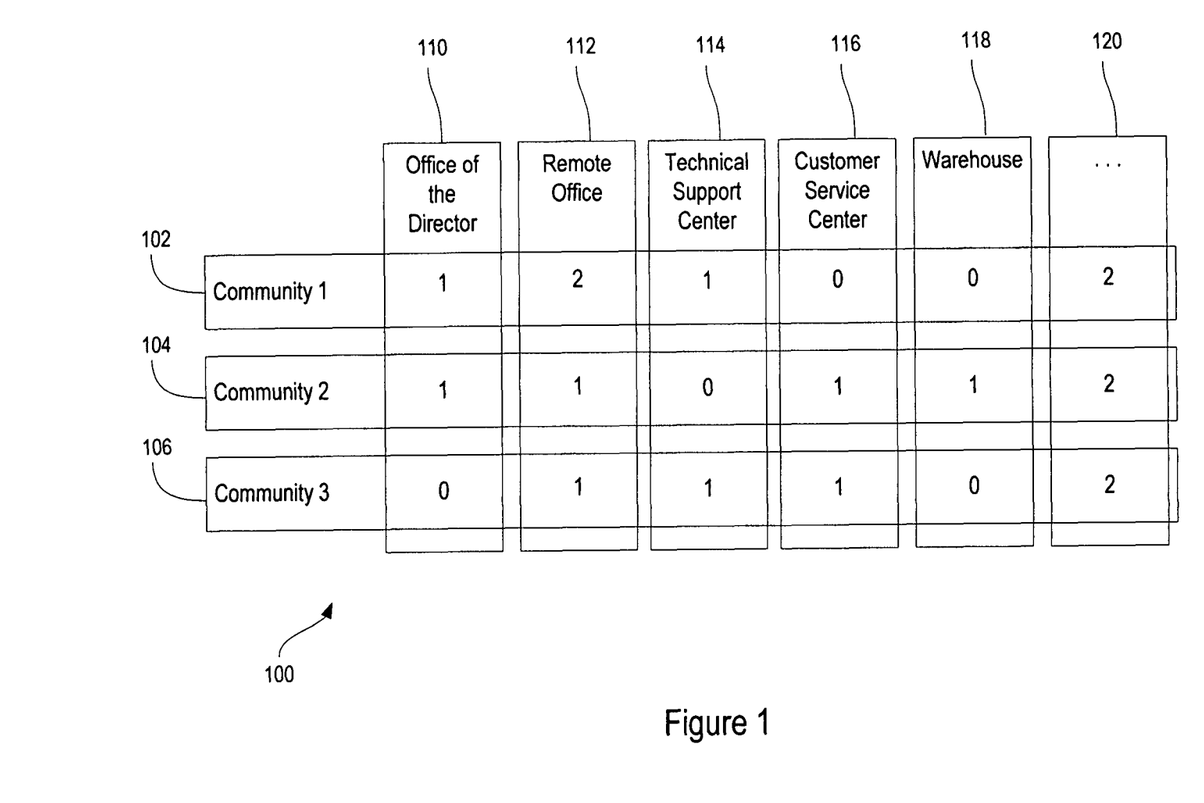
FIG. 1 shows an exemplary distribution of communities within a particular organization.

Similarly, advances in data processing and telecommunications technology have lead to multinational organizations with employees located across the world. FIG. 1 shows an exemplary distribution 100 of communities 102, 104, and 106 within a particular organization. As used herein, a community may include one or more users having a particular skill set, such as subject matter expertise in a particular area, or it may include one or more users that belong to a particular group. For example, a telecommunications organization may include a community for users having expertise relating to a particular administrative form used to establish new customer accounts. As another example, a medical organization may include a community of cardiologists. Virtually any criteria may be used for determining a community.

As shown in FIG. 1, a particular organization may encompass one or more locations, which may be physically located in the same area or may be physically separated. For example, an organization may include an office of the Director location 110, a remote office location 112, a technical support center location 114, a customer service center location 116, a warehouse location 118, and other locations 120. Each location may include one or more users that belong to different communities, such as community 1 102, community 2 104, and community 3 106. In one example, community 1 102 may include a user at the office of the Director location 110, two users at the remote office location 112, a user at the technical support center location 114, and two users at other locations 120.

As a result of the plethora of product and service offerings, not to mention the distribution of skill sets across an organization, users such as customer service representatives may not be able to service every request of a different member. For example, a user may call a customer service center to establish a new account or receive technical information. Typically, the call is placed in a queue until a customer service representative is available. If the customer service representative is unable to answer a particular user's question, the caller is transferred to a different department where the caller is placed into a second queue to await a representative from the second department.

This process may continue until the caller is finally connected to an individual can answer the question. For example, assume a caller desires to establish a new account. The representative may collect information from the caller to establish the new account. If the representative is unable to complete the process for any reason, such as the inability to compete even a single question on a form, the caller may need to be transferred. The second representative may be required to collect the same information as the first representative.

Throughout this process, the caller is utilizing valuable network resources. Simultaneously, additional users may also be calling for help. These callers may be forced to wait in the queue until the first caller's issue is resolved, compounding the load on network resources. In short, call centers experience the technical problem of wasted network resources.

In an attempt to address this technical problem, knowledge management portals have been created that contain information relating to the universe of an organization's business. A customer service representative may access a knowledge management portal when faced with a difficult question in order to find a solution. While knowledge management portals may be effective, they still suffer from inherent problems. First, a customer service representative must find the relevant information within the portal. Second, even if the representative finds the relevant information, lack of experience in the particular area may prevent the representative from recognizing the answer quickly. In some instances, the representative's lack of experience in the particular area may prevent them from finding the answer even if it may be found in knowledge management portal. As a result, network resources are still wasted by the inefficient sharing of corporate knowledge.

Accordingly, a need has long existed for an improved user collaboration system that allows an organization to more efficiently utilize its network resources.

SUMMARY

A user collaboration system implements several technical solutions to the technical problems associated with efficiently, flexibly, and reliably utilizing an organization's resources when facilitating communications between users. As a result, the user collaboration system reduces the cost and time expenditures typically associated with servicing customer requests, such as the requests processed by call centers. The user collaboration system also utilizes available network resources for a collaboration session in a highly efficient manner.

One technical solution is to maintain presence information for subject matter experts within an organization and to communicate that presence information to users requiring assistance in particular subject matter areas. Specifically, interface controls may be provided that allow the user to initiate a collaboration session with an anonymous member of a community. As a result, a user may quickly and easily initiate a collaboration session with another user in the organization without having to transfer a caller to another department.

Another technical solution lies in maintaining community membership information and automatically determining which member of the community should receive a given request. In the past, users who required immediate assistance needed to know who possessed the required expertise in the organization. Even if the user knew of a particular expert, there was no guarantee that the expert was available. Moreover, if a particular expert was popular within the organization, that expert may have received an inordinate amount of requests for help. Centralizing this community information across the organization alleviates the need for a particular user to know which users in the organization have the expertise required. Similarly, automating the routing of requests allows for the more efficient utilization of an organization's knowledge base, and it allows for quicker servicing of requests for assistance.

In one aspect, a user collaboration system is provided. The user collaboration system may include a user profile database for the storing of community membership information. The community membership information may include information about members for multiple communities, and each community may include multiple members.

The user collaboration system may also include a memory. The memory may include a presentation layer for receiving a request for a collaborative session with an anonymous member of a community, the request associated with a first user, and the request specifying a community. The user collaboration system may also include a logic layer that may include a presence component operative to determine available members of the community. The logic layer may also include a filter component, operative so as to determine a second user from the determined available members, and further operative to send collaboration session information to the first user and the second user in order to enable the first user and the second user to initiate a collaborative session.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily drawn to scale, with an emphasis instead being placed upon illustrating the principles of the invention. Moreover, in the figures, like-referenced numerals designate corresponding parts or elements throughout the different views.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the messaging interface may be stored on, distributed across, or read from other machine-readable media, such as secondary storage devices including hard disks, floppy disks, and CD-ROMs, a signal received from a network, or other forms of ROM or RAM either currently known or later developed.

Furthermore, although specific components of the communications architecture will be described, the methods, systems, and articles of manufacture consistent with the user collaboration system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Systems may be implemented in hardware, software, or a combination of hardware and software in one processing system, or distributed across multiple processing systems.

Figure 2:
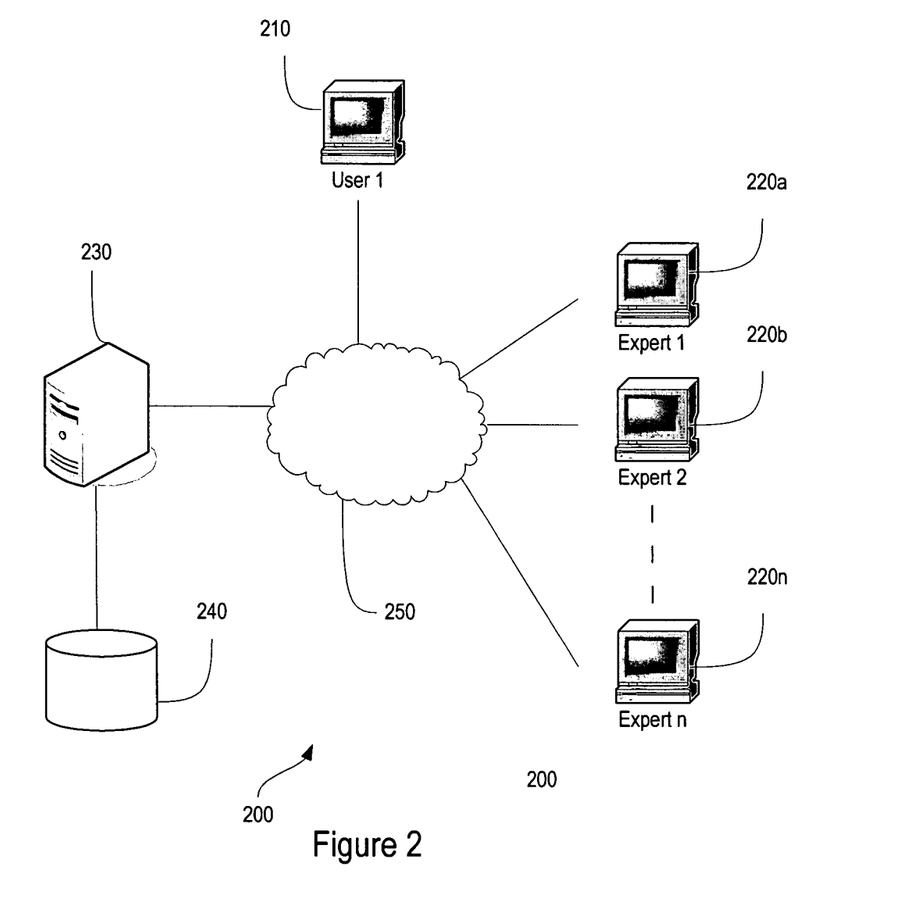
FIG. 2 shows an exemplary architecture which includes a collaboration session system for facilitating collaboration sessions between users at disparate locations.

FIG. 2 shows an exemplary architecture 200 which includes a collaboration session server 230 for facilitating collaboration sessions between users 210, 220a, 220b, 220n at disparate locations. The architecture 200 may include a user client system 210, one or more subject matter expert client systems 220a, 220b, and 220n, a collaboration session server 230, a database 240, and a communications network 250.

Although references will now be made to specific components of the system performing specific features, it should be apparent to one of ordinary skill in the art that such references are exemplary and are not intended to limit the scope of the claims in any way; furthermore, the functionalities described herein may be implemented in a virtually unlimited number of configurations. For example, although figuratively attached to collaboration session server 230, the database 240 may, in practice, distribute user-specific data elements to client systems 210 and 220a, 220b, and 220n. Also, the collaboration session server 230 may be implemented as a single server configured to provide all of the system's functionalities, or the functionalities may be implemented across multiple servers. Similarly, the user client system 210 and subject matter expert client systems 220a, 220b, and 220n may be implemented as a single client system configured to provide both user and subject matter expert related functionalities. Finally, the communications network 250 may be any private or public communication network, such as the Internet, and may include one or more communications networks.

The collaboration session server 230 facilitates a collaboration session between the user (via the user client system 210) and a subject matter expert (via the subject matter expert client system 220a, 220b, 220n) as the result of a user request for a collaboration session with a subject matter expert. In servicing the request, the collaboration session server 230 may utilize network presence information and subject matter expert profile information maintained in the database 240. In one implementation, the database 240 may be implemented as a user profile access management system. The user profile access management system may include a presence system which provides a single point of access for user authentication and user network presence detection services. RADIUS or DHCP servers or proxies may communicate user connection messages to the presence system. In response, the presence system may initiate user authentication with a unified directory system, update user information in the unified directory system, or take other actions.

The unified directory system of the access management system may provide a single point of access to user profile information. The unified directory system may respond to user insertion or update messages from the presence system; likewise, it may respond to user information queries from external systems, such as a service broker, third party gateway, or other systems outside the unified directory system. The collaboration session server 230 may query the unified directory system to obtain the requested information about user availability, connection characteristics, device characteristics, community membership information, or other user profile information. The unified directory system may return query results to the collaboration session server 230.

A communication interface may be implemented between the presence system and the unified directory system. In addition, the unified directory system may implement a communication interface between the unified directory system and the collaboration session server 230. The presence interface and/or the external interface may be implemented as a hypertext transfer protocol (HTTP) interface, Java™ database connectivity (JDBC) interface, or other type of communication interface, including an interface for exchanging messages between the systems.

Figure 3:
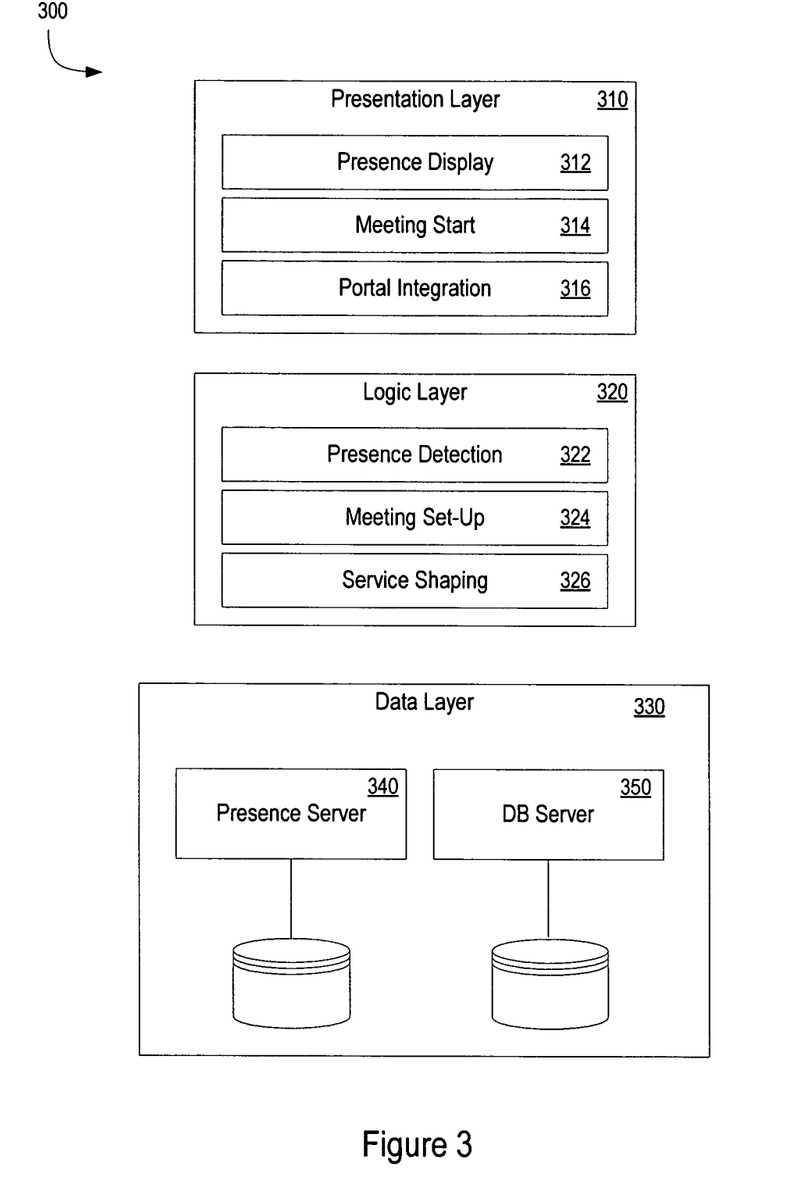
FIG. 3 shows an exemplary architecture for a collaboration session system.

FIG. 3 shows an exemplary architecture 300 for a collaboration session system. The architecture 300 may include a presentation layer 310 for providing front-end functionalities to a user and a logic layer 320 that may provide back-end capabilities. The architecture 300 may also include a data layer 330 for maintaining presence and user profile information. In one implementation, the presentation layer 310 may be implemented using JavaScript™ and the .Net platform provided by Microsoft Corporation of Redmond, Wash., the logic layer 320 may be implemented using JAVA™ and the Net platform, presence information may be maintained using a SIP server, such as the Microsoft Live Communications Server™, provided by Microsoft Corporation of Redmond, Wash., and user profile information may be maintained using an SQL server.

The presentation layer 310 may provide presence display capabilities 312, meeting start capabilities 314, and client integration capabilities 316. Presence information may be displayed in a variety of formats. In one implementation, presence information may be displayed by community, so that a listing of one or more communities is displayed to the user. An indicator may be provided that informs the user that at least one member of a community is available. The indicator may be an interface control accessible via the user client system 210. Other ways of displaying presence information may also be used.

As will be described in more detail below, the meeting start capabilities 314 allow a user to request, schedule, and/or begin a collaboration session. In one implementation, an interface control may be provided that allows the user to request a collaboration session with a member of a particular community. For example, the user may select the presence indicator described above for a particular community to request a collaboration session with a member of that community.

The presentation layer may include client integration capabilities 316. The client integration capabilities 316 may provide functionalities that allow the collaboration session server 230 to communicate with the user client system 210 and the subject matter expert client systems 220a, 220b, and 220n. In one implementation, the client integration capabilities 316 may include capabilities that integrate the collaboration session server's 230 services into an existing organization's knowledge management portal. For example, the knowledge management portal may include data items that are sorted by subject matter, which allows expert presence information for each particular subject matter area to be readily recognizable by a user searching for knowledge in the particular subject matter area.

As will be described in more detail below, the logic layer 320 may provide presence detection capabilities 322, meeting set-up capabilities 324, and service shaping capabilities 326. The presence detection capabilities 326 may include detecting presence information from the data layer 330 and passing presence information to the presentation layer 310 and/or the meeting set-up capabilities 324. The meeting set-up capabilities 324 may include selecting an appropriate subject matter expert for a particular collaboration session request, updating both the user client 210 and the selected subject matter expert client 220 with session information for the collaboration session, maintaining scheduled collaboration session meetings, and instantiating meetings once the available subject matter experts become available. The service shaping 326 capabilities may include bandwidth customization for a collaboration session based on the available resources of the user and selected subject matter expert.

Figure 4:
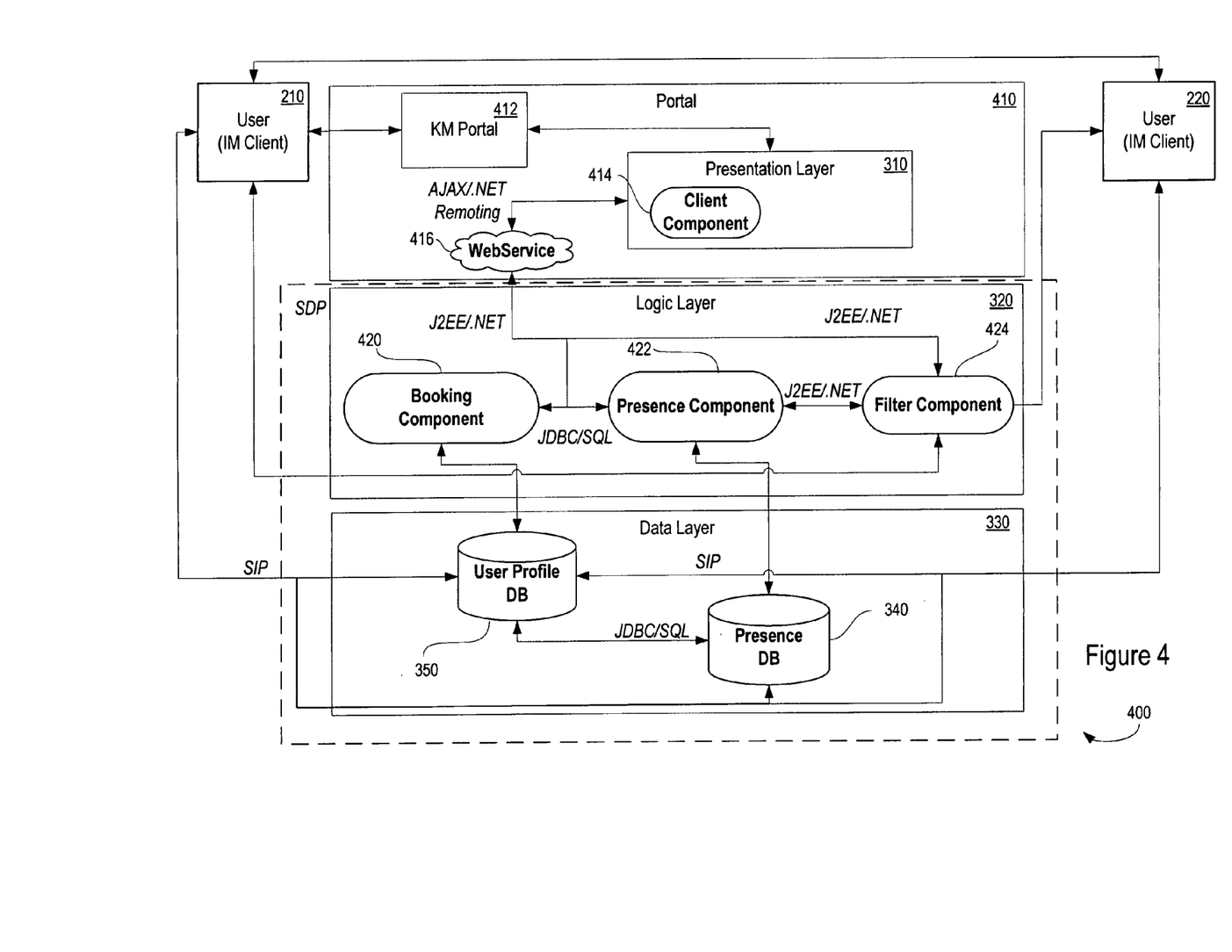
FIG. 4 shows another exemplary architecture for a collaboration session system.

FIG. 4 shows another exemplary architecture 400 for a collaboration session system. The architecture 400 may include a portal layer 410 accessible via a user client 210. The user client 210 may provide users with the ability to chat, share applications, and conduct multi-media collaboration sessions. The user client 210 may also log the user into the SIP Server and monitor user status so that the user's presence information is available and up-to-date on the network. In one implementation, the user client may include the MS Office Communicator 2005 client, provided by Microsoft Corporation of Redmond, Wash.

The portal layer 410 may include a knowledge management portal 412 and the presentation layer 310. The presentation layer 310 may include a client component 414 that connects the user client 210 to the logic layer 320; the presentation layer 310 may also provide the ability to display presence information to the user in an easy to read and user-friendly manner. In one implementation, the client component 414 may communicate with the logic layer 320 via a web service 416. The client component 414 may also provide for the initial set-up of a collaboration session, and initiate the process of scheduling a meeting.

The logic layer 320 may include a booking component 420, a presence component 422, and a filter component 424. The booking component 420 may be in communication with the presence component 422 and the user profile database 350 and may provide information for the client component 414 regarding meetings scheduled for the logged-in user. The component may also send the booking information to the client component 414 through the presence component 422. The booking component 420 may also monitor scheduled meetings and initiate collaboration sessions for scheduled meetings when an appropriate subject matter expert becomes available.

The presence component 422 may monitor presence information for users of the collaboration system. The presence component may be in communication with the booking component 420, the filter component 424, and the presence database 340. When a request for a subject matter expert is received, the presence component 422 may determine the availability of the users having the specified subject matter expertise and forward that information to the filter component 424. The presence component 422 may also assist the booking component 420 to determine when subject matter experts for scheduled collaboration sessions become available.

The filter component 424 may determine which subject matter expert should receive a request, determine the collaboration session information for a collaboration session, and update both the user client system 210 and subject matter expert client system 220 with the determined collaboration session information. The filter component 424 may be in communication with the presence component 422, the user client system 210, and the subject matter expert client system 220.

After receiving availability information for the requested subject matter experts from the presence component 422, the filter component may determine which available member of the community should receive the request. The routing of requests may be customized based on the needs of the organization. One factor to consider is the grouping of the expert and assigning user requests for assistance in specific areas to the appropriate group of experts. The expert's presence on the network may also be a factor, along with the expert's connection type, bandwidth, and other characteristics such as those defined in the Network Service Presence Table below (Table 15).

Additionally, the idle time of expert resources and the number of current collaboration sessions in which the expert is engaged may also be considered. Optionally, an expert rating may be utilized to determine the quality of answers given by experts. In such an implementation, the routing of requests may be based on the expert rating. The routing of requests may also be based on characteristics of the expert's application resources, such as those characteristics maintained in the Application Service Presence Table (Table 16) below. In one implementation, the filter component 424 evenly distributes requests to available subject matter experts. For example, the filter component 424 may maintain counts of requests serviced by particular subject matter experts and determine the appropriate subject matter for a particular request based in part on the counts.

The filter component 424 may also determine the collaboration session information for a collaboration session. The collaboration session information may include connection information and service share information. The connection information may include information relating the establishment of a collaboration session between the user and the determined subject matter expert, and may include IP address information for the user client 210 and subject matter expert client system 220. The connection information may also include identifiers for the user and subject matter expert.

In one implementation, the filter component 424 may mask the identity of the subject matter expert from the user so that the selected subject matter expert is not repeatedly contacted by the user outside of the collaboration system (for example, by calling the subject matter expert). The filter component 424 may mask the identity of the user by using a generic identifier for the expert, such as "expert 1."

The collaboration session information may also include service share information that may specify the type of collaboration session. For example, the service share information may that a particular collaboration session may include features such as text messaging, voice and/or video conferencing, file transportation, application sharing, and the like. Other features may also be included in a collaboration session. In one implementation, the filter component 424 may determine which features to include during a particular session based on the bandwidth characteristics associated with the user and subject matter expert. For example, the filter component may determine that a subject matter expert utilizing a cell phone should only receive text messages and/or audio, while another expert utilizing a broadband connection may establish a video conference. Table 1 shows typical bandwidth usage rates for various collaboration session features.

TABLE 1

Bandwidth Usage Table

| Session Feature | Upper Bandwidth Usage | Lower Bandwidth Usage |
|---|---|---|
| Text | 1.5 Kb/s | 0.5 Kb/s |
| Audio | 2.1 Kb/s | 2.0 Kb/s |
| Video | 46.3 Kb/s | 20.8 Kb/s |
| Sharing | 33.1 Kb/s | 8.5 Kb/s |
| TOTAL | 83.0 Kb/s | 30 Kb/s |

Finally, the filter component 424 may update both the user client system 210 and subject matter expert client system 220 with the determined collaboration session information.

Figure 5:
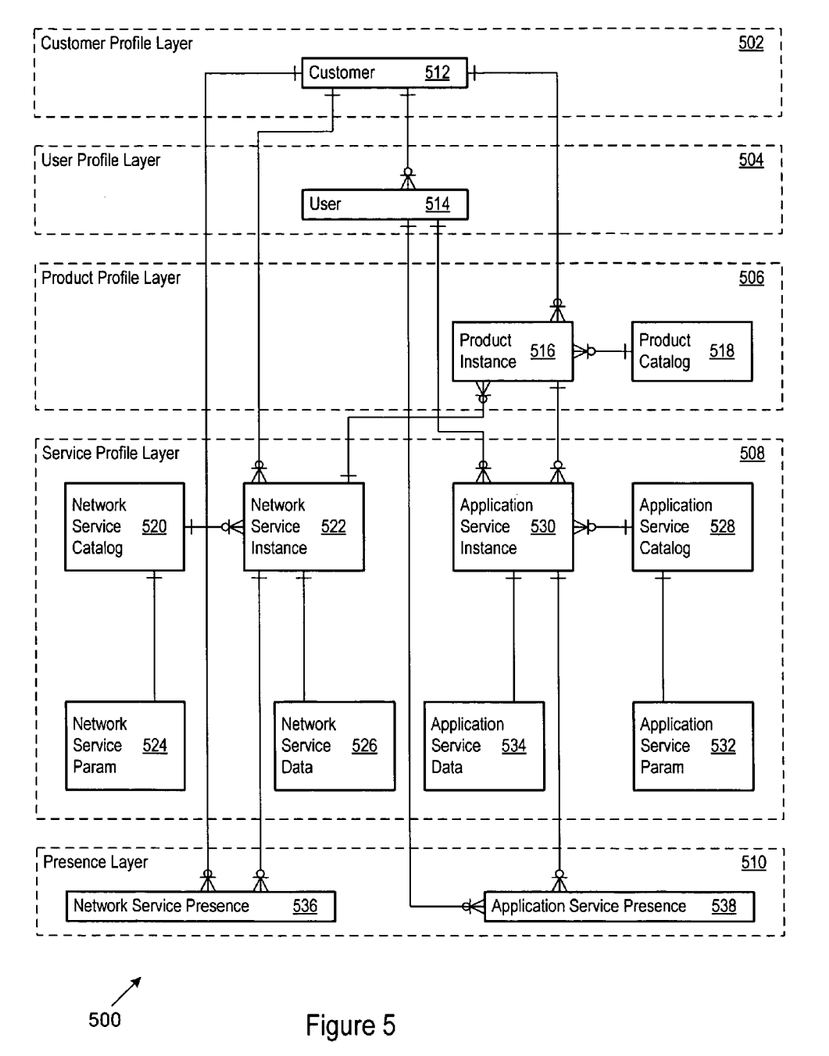
FIG. 5 shows an exemplary data model which may implement a subject matter expert profile data store maintained in a database.

FIG. 5 shows a data model 500 which may implement a user profile data store. The data model 500 is divided into a customer profile layer 502, a user profile layer 504, and a product profile layer 506. In addition, the data model 500 also defines a service profile layer 508 and a presence layer 510. The division of the data model 500 into layers efficiently segments user profile data into dynamically changing information in the presence layer 510, and into more static information in the service profile layer 508. The table structure defined in the data model 500 also provides a technical solution to separating network services from application services. Thus, presence information for each may be independently established and maintained for any user.

The customer profile layer 502 defines a customer table 512. The customer table 512 may establish the data fields which characterize a physical person or legal entity which subscribes to telecommunication service products, such as an employee of an organization. The user profile layer 504 defines a user table 514. The user table 514 may establish data fields which characterize a physical person who subscribes to one or more products and/or services (e.g., an instant messaging application) and the services available on the products (e.g., instant messaging service).

The product profile layer 506 defines a product instance table 516 and product catalog tables 518. The product instance table 516 establishes the data fields which instantiate a telecommunication service provider's offerings, such as a particular service or product. The product catalog tables 518 establish the data fields which instantiate a whole catalog of products and special offers available from the telecommunication service provider.

The service profile layer 508 defines a network service catalog table 520, a network service instance table 522, a network service parameters table 524, and a network service data table 526. The network service catalog table 520 instantiates a catalog of network services offered by a telecommunications service provider. The network service instance table 522 instantiates a particular network service offered on a product to which a subject matter expert has access. The network service parameters table 524 instantiates parameters applicable to network services in the catalog of network services. The network service data table 526 instantiates the data which characterizes a particular network service instance.

The service profile layer 508 also defines an application service catalog table 528, an application service instance table 530, an application service parameter table 532, and an application service data table 534. The application service catalog table 528 instantiates a catalog of application services offered by a telecommunications service provider. The application service instance table 530 represents a particular application service offered on a product to which a subject matter expert has access. The application service parameters table 532 instantiates parameters applicable to application services in the catalog of network services. The application service data table 534 instantiates the data which characterizes a particular application service instance.

The presence layer 510 defines a network service presence table 536 and an application service presence table 538. The network service presence table 536 establishes the data fields which characterize network resource access connectivity, keeping track of recent user connection information with respect to the network services (e.g., an established connection to a DSL network service). The application service presence table 538 establishes the data fields which characterize user access to application services, including whether the user is logged in to or out of any of the subscribed application services, such as an instant messaging application service.

Table 2 below provides an example implementation of the customer table 512.

TABLE 2

Customer Table

| SDP_CUST_T | | CUSTOMER |
|---|---|---|
| FIELD | TYPE | DESCRIPTION |
| CUSTID | NUMBER(20) | Customer Identifier, may be a primary key. |
| ENTNAME | VARCHAR2(50) | Name Of The Enterprise |
| FIRSTNAME | VARCHAR2(50) | First Name |
| MIDDLENAME | VARCHAR2(50) | Middle Name |
| SURNAME | VARCHAR2(50) | Second Name |
| ENTFISCALCODE | VARCHAR2(50) | Enterprise Fiscal Code |
| FISCALCODE | VARCHAR2(50) | Fiscal Code |
| LEGALSTATUS | VARCHAR2(50) | Legal Status |
| DATEOFBIRTH | DATE | Date Of Birth |
| PLACEOFBIRTH | VARCHAR2(50) | Place Of Birth |
| CIVILSTATUS | VARCHAR2(20) | Civil Status |
| GENDER | CHAR(1) | Gender, e.g., 'M' or 'F' |
| TEL | VARCHAR2(50) | Telephone Contact |
| CONTACTTEL | VARCHAR2(50) | First Tel Contact |
| CONTACTEL2 | VARCHAR2(50) | Second Tel Contact |
| CONTACTFAX | VARCHAR2(50) | Contact Fax |
| MOBILETEL | VARCHAR2(50) | Mobile Phone Number |
| FAX | VARCHAR2(50) | Fax Contact |
| CUSTTYPE | VARCHAR2(20) | Customer Type |

Table 3 below provides an example implementation of the user table 514.

TABLE 3

User Table

| SDP_USR_T | | USER |
|---|---|---|
| FIELD | TYPE | DESCRIPTION |
| USRID | VARCHAR2(20) | Username@Domain, may be a primary key. |
| CUSTID | NUMBER(20) | Customer Identifier, may be a foreign key from SDP_CUST_T |
| ISMASTER | CHAR(1) | Flag Indicating If User Is Master User |
| ISFIRSTCONNECT | CHAR(1) | Flag Indicating If User Is A Default User For Subscription |
| DISPLAYNAME | VARCHAR2(200) | Full Name Of User |
| IDENTITY | VARCHAR2(50) | Provides an alias identity for the subject matter expert, such as a nickname or other alias which the subject matter expert uses with instant messaging, chat, or other telecommunication services. |
| PWD | VARCHAR2(50) | Password |
| USRSTATUS | VARCHAR2(20) | USER STATUS, e.g., Active, Blocked, Pending, Configured. May Default To 'Active' |
| CREATEDATE | DATE | CREATION DATE, May Default To The System Date |
| EXPDATE | DATE | Expiry Date |
| LASTMODIFYDATE | DATE | Last Modification Date |
| LASTMODIFYDESC | VARCHAR2(50) | Last Modification Description |
| LASTMODIFYWRITER | VARCHAR2(50) | Last Modification Writer |
| FIRSTCONNECTDATE | DATE | First Ever Connection Date |
| LASTCONNECTDATE | DATE | Last Ever Connection Date |
| AUTHTYPE | VARCHAR2(20) | Type Of Authentication |

Tables 4, 5, and 6 below provide an example implementation of the product profile layer 506.

TABLE 4

Product Instance Table

| SDP_SUB_T | | PRODUCT INSTANCE |
|---|---|---|
| FIELD | TYPE | DESCRIPTION |
| SUBID | NUMBER(20) | Subscription Identifier, may be a primary key |
| CUSTID | NUMBER(20) | Customer Identifier, may be a foreign key from SDP_CUST_T |
| PRODCODE | VARCHAR(20) | Product Code, may be a foreign key from SDP_PROD_T |
| CUSTNETSVCID | NUMBER(20) | Customer Network Service Combination Identifier, may be a foreign key from SDP_CUST_NET_SVC_T |
| SUBSTATUS | VARCHAR2(20) | Subscription Status, may default to Active |
| BILLINGCLI | VARCHAR2(24) | Billing Call Line Identifier |
| CREATEDATE | DATE | Creation Date, may default to the System Date |
| EXPDATE | DATE | Expiry Date |
| SUBTYPE | VARCHAR2(20) | Subscription Type |
| BILLINGTYPE | VARCHAR2(20) | Type Of Billing |
| LASTMODIFYDATE | DATE | Last Modification Date |
| LASTMODIFYDESC | VARCHAR2(50) | Last Modification Description |
| LASTMODIFYWRITER | VARCHAR2(50) | Last Modification Writer |

TABLE 5

Product Catalog Table

| SDP_PROD_T | | PRODUCT CATALOGUE |
|---|---|---|
| FIELD | TYPE | DESCRIPTION |
| PRODCODE | VARCHAR2(20) | Product Code, may be a primary key |
| OFFERCODE | VARCHAR2(20) | Product Offering Identifier, may be a foreign key from SDP_OFFER_T |
| PRODNAME | VARCHAR2(50) | Name Of The Product |
| PRODTYPE | VARCHAR2(20) | Type Of The Product |
| PRODCODE | VARCHAR2(20) | Code Of The Product |
| PRODSTATUS | VARCHAR2(20) | Status Of The Product |

TABLE 6

Product Offer Table

| SDP_OFFER_T | | PRODUCT CATALOGUE |
|---|---|---|
| FIELD | TYPE | DESCRIPTION |
| OFFERCODE | VARCHAR2(20) | Product Offering Identifier, may be a primary key |
| OFFERNAME | VARCHAR2(200) | Product Offering Name |
| OFFERSTATUS | VARCHAR2(20) | Product Offering Status |
| COMOFFERTYPE | VARCHAR2(50) | Commercial Product Offering Name |

Tables 7, 8, 9, 10, 11, 12, 13, and 14 below provide an example implementation of the service profile layer 508. The service profile layer allows the data model 500 to distinguish between network services and application services. The network services may be services offered by telecommunication operators which permit subject matter experts to connect to the network such as those offered by a DSL or dial-up service. The application services may represent the applications (e.g., programs) which the subject matter expert may use over the network (e.g., instant messaging, IPTV, and VoIP applications).

TABLE 7

Application Service Instance Table

| SDP_USR_SVC_T | | APPLICATION SERVICE INSTANCE |
|---|---|---|
| FIELD | TYPE | DESCRIPTION |
| USRSVCID | NUMBER(20) | User - Service Combination Identifier, may be a primary key |
| SVCCODE | VARCHAR2(20) | Service Identifier, may be a foreign key from SDP_SVC_T |
| USRID | VARCHAR2(50) | Resource Identifier, may be a foreign key from SDP_USR_T |
| SUBID | NUMBER(20) | Subscription Identifier, may be a foreign key from SDP_SUB_T |
| STATUS | VARCHAR2(20) | Service Activation Status |

TABLE 8

Application Service Catalog Table

| SDP_SVC_T | | APPLICATION SERVICE CATALOG |
|---|---|---|
| FIELD | TYPE | DESCRIPTION |
| SVCCODE | VARCHAR2(20) | Service Code, may be a primary key |
| SVCNAME | VARCHAR2(50) | Service Name |
| SVCTYPE | VARCHAR2(20) | Service Type |
| SVCSTATUS | VARCHAR2(20) | Service Status |

TABLE 9

Application Service Parameter Table

| SDP_SVC_SPEC_T FIELD | APPLICATION SERVICE PARAM TYPE | DESCRIPTION |
|---|---|---|
| SVCCODE | VARCHAR2(20) | Service Code, may be a primary key and/or a foreign key from SDP_SVC_T |

TABLE 9-continued

Application Service Parameter Table

| SDP_SVC_SPEC_T FIELD | APPLICATION SERVICE PARAM TYPE | DESCRIPTION |
|---|---|---|
| APPSERVICEPARAMNAME | VARCHAR2(50) | Application Service Param Name, may be a primary key |
| APPSERVICEPARAMTYPE | VARCHAR2(50) | Application Service Param Type |

TABLE 10

Application Service Data Table

| SDP_USR_SVC_PROP_T FIELD | APPLICATION SERVICE DATA TYPE | DESCRIPTION |
|---|---|---|
| USRSVCID | NUMBER(20) | User - Service Combination Identifier, may be a primary key and/or a foreign key from SDP_USR_SVC_T |
| APPSERVICEPARAMNAME | VARCHAR2(50) | Application Service Parameter Name, may be a primary key |
| APPSERVICEDATA | VARCHAR2(50) | Application Service Data |

TABLE 11

Network Service Instance Table

| SDP_CUST_NET_SVC_T FIELD | NETWORK SERVICE INSTANCE TYPE | DESCRIPTION |
|---|---|---|
| CUSTNETSVCID | NUMBER(20) | User Network Service Combination Identifier, may be a primary key. This field identifiers a unique association between a customer and a network service and may qualify the subscription (as a foreign key) to the service. |
| CUSTID | NUMBER(20) | Customer Identifier, may be a foreign key from SDP_CUST_T |
| NETSVCCODE | VARCHAR2(20) | Network Service Code, may be a foreign key from SDP_NET_SVC_T |
| ACCESSSERVERID | VARCHAR2(50) | |
| ACCESSSERVERIP | VARCHAR2(15) | |
| SLOT | NUMBER(3) | |
| PORT | NUMBER(3) | |
| INTERFACE | NUMBER(20) | |
| VCI | NUMBER(5) | |
| VPI | NUMBER(5) | |
| MAXAVAILBAND | NUMBER(5) | Provides an identifier of a maximum available bandwidth for the network service. |
| GUARBAND | NUMBER(5) | Provides an identifier of the guaranteed bandwidth for the network service. |
| COS | NUMBER(5) | Provides an identifier of a class of service, such as 'Gold' or 'Silver' indicators of bandwidth or other service characteristics. |

TABLE 12

Network Service Catalog Table

| SDP_NET_SVC_T | | NETWORK SERVICE CATALOGUE |
|---|---|---|
| FIELD | TYPE | DESCRIPTION |
| NETSERVICECODE | VARCHAR2(20) | Network Service Code (i.e., NETSVCCODE), may be a primary key which provides a unique identifier of a network service in the catalogue. |
| NETSERVICENAME | VARCHAR2(50) | Network Service Name |
| NETSERVICETYPE | VARCHAR2(20) | Network Service Type |
| NETSERVICESTATUS | VARCHAR2(20) | Network Service Status |

TABLE 13

Network Service Parameter Table

| SDP_NET_SVC_SPEC_T | | NETWORK SERVICE PARAM |
|---|---|---|
| FIELD | TYPE | DESCRIPTION |
| NETSERVICECODE | VARCHAR2(20) | Network Service Code, may be a primary key and/or a foreign key from SDP_NET_SVC_T |
| NETSERVICEPARAMNAME | VARCHAR2(50) | Network Service Param Name, may be a primary key |
| NETSERVICEPARAMTYPE | VARCHAR2(50) | Network Service Param Type |

TABLE 14

Network Service Data Table

| SDP_NET_SVC_PROP_T | | NETWORK SERVICE DATA |
|---|---|---|
| FIELD | TYPE | DESCRIPTION |
| CUSTNETSVCID | NUMBER(20) | Customer Network Service Combination Identifier, may be a primary key and/or a foreign key from SDP_CUST_NET_SVC_T |
| NETSERVICEPARAMNAME | VARCHAR2(50) | Network Service Param Name, may be a primary key |
| NETSERVICEDATA | VARCHAR2(50) | Network Service Data |

Tables 15 and 16 below provide an example implementation of the presence layer 510.

TABLE 15

Network Service Presence Table

| SDP_NET_PRES_T | | NETWORK SERVICE PRESENCE |
|---|---|---|
| FIELD | TYPE | DESCRIPTION |
| USRID | VARCHAR2(50) | Username@Domain, may be a primary key |
| CUSTNETSVCID | NUMBER(20) | Customer Network Service Combination Identifier, may be a foreign key from SDP_CUST_NET_SVC_T. This field provides a unique identifier of an association between a customer and a network service, and may qualify a subscription to a service. |
| IDENTITY | VARCHAR2(50) | Alias Identity |
| IP | VARCHAR2(50) | IP Address |

TABLE 15-continued

Network Service Presence Table

| SDP_NET_PRES_T | | NETWORK SERVICE PRESENCE |
|---|---|---|
| FIELD | TYPE | DESCRIPTION |
| ACCESSSERVERIP | VARCHAR2(50) | Access Server IP |
| ACCESSSERVERID | VARCHAR2(15) | Access Server ID |
| MAXAVAILBAND | NUMBER(5) | Max Available Band |
| GUARBAND | NUMBER(5) | Guaranteed Band |
| NETSERVICECODE | VARCHAR2(20) | Network Service Code |
| TIMESTAMP | DATE | Timestamp |

TABLE 16

Application Service Presence Table

| SDP_SVC_PRES_T | | APPLICATION SERVICE PRESENCE |
|---|---|---|
| FIELD | TYPE | DESCRIPTION |
| USRSVCID | NUMBER(20) | User - Service Combination Identifier, may be a primary key and/or a foreign key from SDP_USR_SVC_T |
| USRID | VARCHAR2(50) | Username@Domain, may be a primary key and/or a foreign key from SDP_USR_T |
| IDENTITY | VARCHAR2(50) | Alias Identity |
| PORT | NUMBER(20) | Port |
| CONTACTIP | VARCHAR2(50) | IP Address |
| EXPIRY | NUMBER(20) | Expiry Time |
| DISPLAYNAME | VARCHAR2(200) | Display Name |
| STATUS | VARCHAR2(20) | Status |

TABLE 16-continued

Application Service Presence Table

| SDP_SVC_PRES_T | APPLICATION SERVICE PRESENCE | |
|---|---|---|
| FIELD | TYPE | DESCRIPTION |
| SVCCODE | VARCHAR2(50) | Service Code |
| TIMESTAMP | DATE | Timestamp |

The network service instance table 522 instantiates the users' subscribed network services. There may exist a one-to-many relationship to the network service presence table 536. Thus, the data model 500 provides tracking capability for multiple sets of presence information for the same network resource, such as tracking multiple PPP sessions on the same DSL modem. Similarly, the application service instance table 530 instantiates the users' subscribed application services. There may exist a one-to-many relationship to the application service presence table 538. Thus, the data model 500 provides tracking capability for multiple sets of presence information for the same user and application resource.

Figure 6:
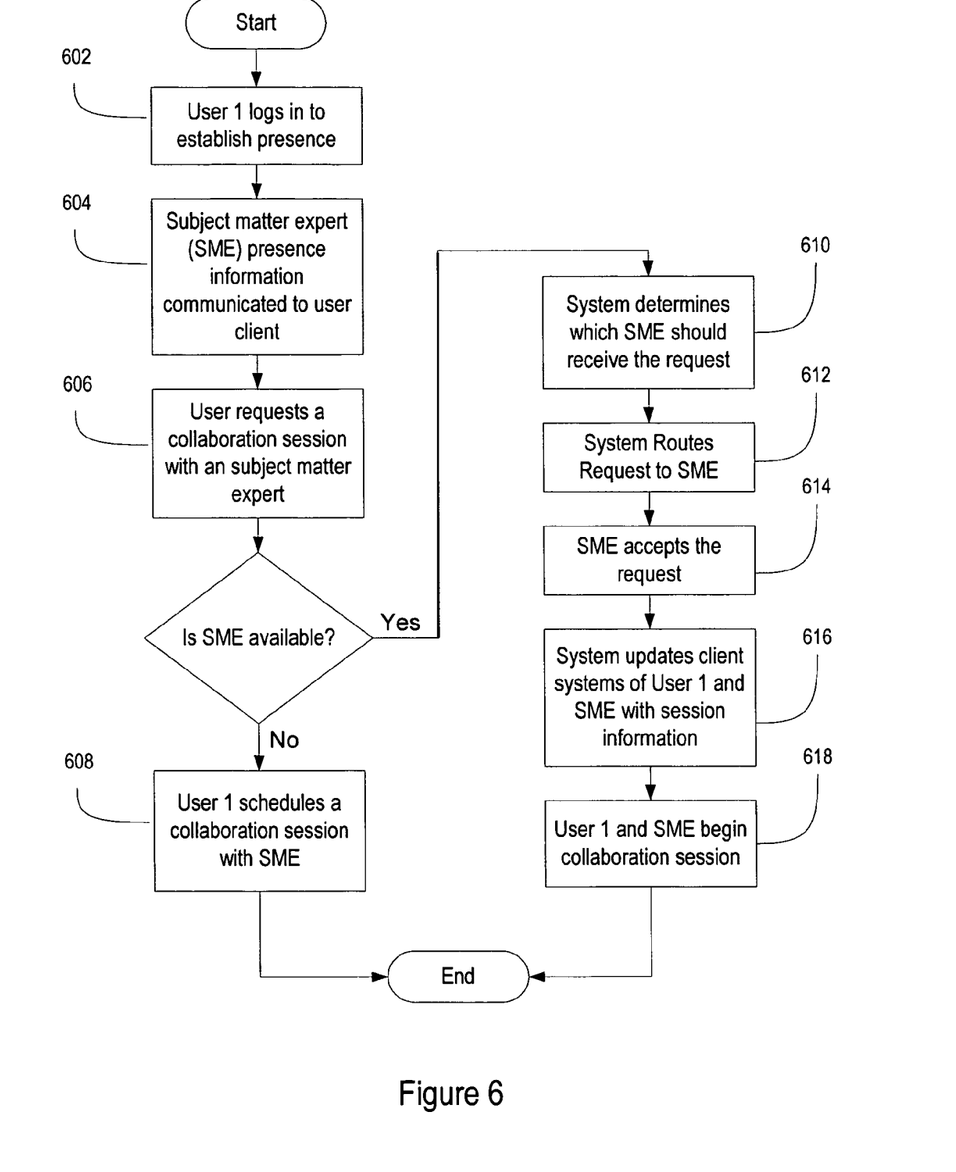
FIG. 6 shows acts that the collaboration session system may take to establish a collaboration session or book a future collaboration session.

FIG. 6 shows acts that the collaboration session system may take to establish a collaboration session or to book a future collaboration session. A user may log in, via a client, to establish network presence (act 602). For example, the user may log in to a SIP server to establish presence. Next, subject matter expert presence information may be communicated to the user (act 604).

The user may then request a collaboration session with a subject matter expert (act 606). As described above, in one implementation the user may request a collaboration session by selecting an interface control of the client 210. The request may then be processed by the collaboration session server 230. If no expert is available, the request may be interpreted as a request for a meeting with an expert once an expert becomes available (act 608). Alternatively, or additionally, a user may schedule a meeting with an expert using an interface control different from the collaboration request interface.

If one or more experts are available, the collaboration session server 230 may determine which available subject matter expert should receive the request (act 610). After a subject matter expert is selected, the collaboration session server 230 may route the request to the subject matter expert (act 612). The subject matter expert may accept the request (act 614), at which point the collaboration session server may update both the user client 210 and expert client 220 with collaboration session information (act 616). The collaboration session information may include, for example, the IP addresses for the user client 210 and expert client 220. The collaboration session information may also include information about the features of the collaboration session. For example, the collaboration session information may specify services to be utilized during the session, such as text messaging, video conferencing, application sharing, and the like. The collaboration session information may be determined dynamically by the collaboration session server 230. For example, the collaboration session server may determine which services should be utilized based on an available bandwidth associated with the user or subject matter expert. Alternatively, or additionally, the collaboration session information may be based on user or subject matter expert preferences. Finally, the user and subject matter expert may engage in a collaboration session in accordance with the collaboration session information (act 618).

Figure 7:
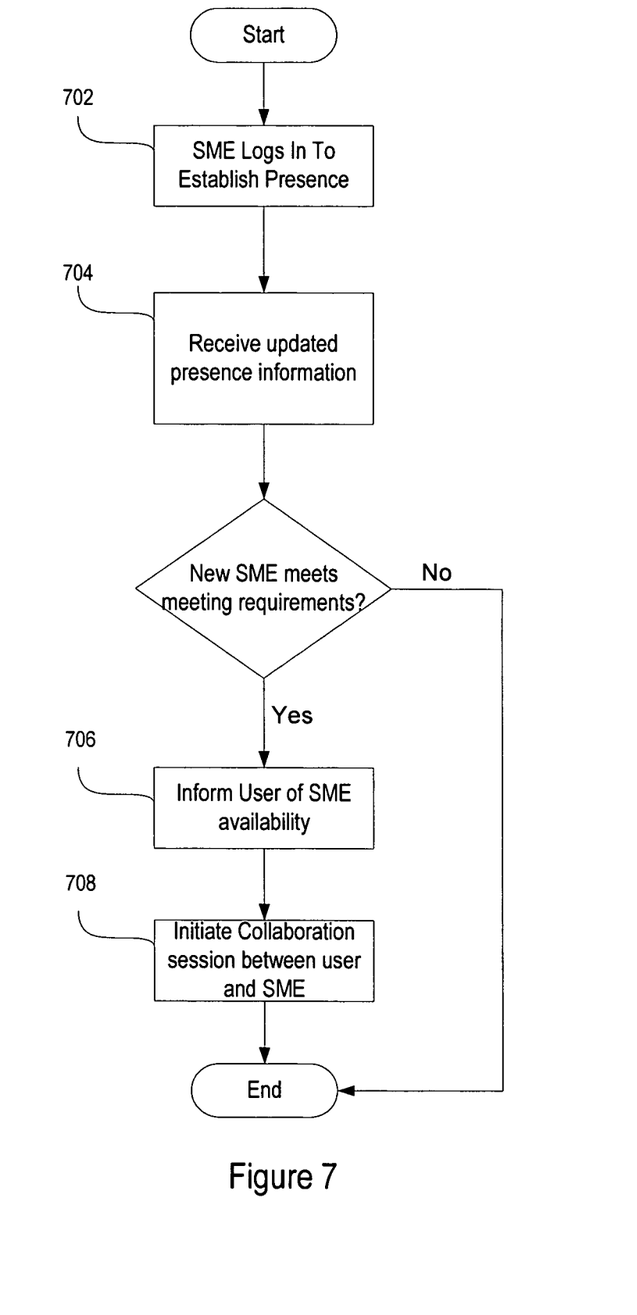
FIG. 7 shows acts that the collaboration session system may take to service a request for a scheduled collaboration session.

FIG. 7 shows acts that the collaboration session system may take to service a request for a scheduled collaboration session. After a meeting has been scheduled by a user, a subject matter expert may log in to establish presence (act 702). The presence information may be updated at the data layer 330 and logic layers 320. The collaboration session server 230 may then determine if the newly logged-in subject matter expert meets the qualifications of any scheduled collaboration sessions. If so, the server 230 may notify the user that a subject matter expert is now available for the previously scheduled session (act 706). A collaboration session between the user and the subject matter expert may then be initiated (act 708), as described with respect to acts 612-618 above. In one implementation, the user may be required to verify that a meeting is still desired before the collaboration session is initiated. Alternatively, the collaboration session server 230 may automatically begin the session without verification from the user. The collaboration session server 230 may also be designed to allow the expert to accept or reject the scheduled meeting.

The user collaboration system 230 employs several technical solutions to the technical problems associated with efficiently, flexibly, and reliably utilizing an organization's resources by facilitating communications between users. As a result, the user collaboration system reduces the cost and time expenditures typically associated with servicing customer requests, such as the requests processed by call centers. The user collaboration system also utilizes available network resources for a collaboration session in a highly efficient manner.

One technical solution is to maintain presence information for subject matter experts within an organization and to communicate that presence information to users who require assistance in particular subject matter areas, such as via interface controls. This enables a user to quickly and easily initiate a collaboration session with another user in the organization without having to transfer a caller to another department.

Another technical solution lies in maintaining community membership information and automatically determining which member of the community should receive a given request. In the past, users who required immediate assistance needed to know who possessed the required expertise in the organization. Even if the user knew of a particular expert, there was no guarantee that the user was available. Moreover, if a particular expert was popular within the organization, that expert may have received an inordinate amount of requests for help. Centralizing this community information across the organization alleviates the need for a particular user to know which users in the organization have the expertise required. Similarly, automating the routing of requests allows the system to maintain an expert's anonymity and more efficiently utilizes an organization's knowledge base. This also allows for the quicker servicing of assistance requests.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A user collaboration system comprising:
a user profile database comprising community membership information, the community membership information including information about community members for a plurality of communities, where each community includes a plurality of the community members;
a non-transitory memory connected to at least one computer processor, the memory comprising:

a presentation layer operative to cause the at least one computer processor to receive a request for a collaborative session with an anonymous member of a specific community among the plurality of communities, the request associated with a first user, the request specifying a first subject matter and the specific community; and a logic layer including:
- a presence component operative to cause the at least one computer processor to determine available community members matching the first subject matter of the specific community from among the plurality of community members of the specific community; and
- a filter component operative to cause the at least one computer processor to:
  - where there is at least one available community member matching the first subject matter, identifying as a second user a member from among the at least one available community members having a type of network connection compatible with the request of the first user and matching the first subject matter;
  - where there are no available community members matching the first subject matter;
    - determine when a member of the specific community becomes newly-available;
    - determine whether the newly-available member of the specific community matches the first subject matter and whether a type of network connection of the newly-available member is compatible with the request of the first user; and
    - where the newly-available member matches the first subject matter and the type of network connection of the newly-available member is compatible with the request, identify the newly-available member as the second user; and
  - select collaboration session information based on the type of network connection and send the selected collaboration session information to the first user and the second user to facilitate initiating a collaborative session between the first user and the second user.

2. The system of claim 1, where the presence component includes a network presence component operative to determine a network presence of any of the community members and to determine the available members based on the network presence.

3. The system of claim 2, where the network presence component is further operative to store network characteristics of any of the available members, and where the filter component is further operative to determine the second user based on the network characteristics of the available members.

4. The system of claim 1, where the logic layer further comprises a booking component operative to facilitate the first user to make a request for a future collaborative session with a requested community member of the specific community if there are no available members.

5. The system of claim 4, where the booking component is further operative to cause the first user to be notified when the requested community member becomes available.

6. The system of claim 1, where the filter component is further operative to mask an identity of the second user from the first user.

7. The system of claim 1, where the filter component is further operative to determine the second user to maintain an even distribution of requests for collaborative sessions serviced by the available members.

8. The system of claim 1, where the filter component is further operative to establish the collaborative session between the first user and the second user.

9. The system of claim 1, where the filter component is further operative to determine the second user from among the available community members based on a bandwidth rating associated with the second user.

10. The system of claim 1, where the filter component is further operative to identify, based on a bandwidth rating associated with the first user, at least one collaboration feature from among a set of available collaboration features to include with the collaboration session.

11. The system of claim 1, wherein the type of network connection comprises a connection by mobile phone to the specific community.

12. A method for establishing a collaborative session over a network, the method comprising:
- receiving, from a first user, a request for a collaborative session with an anonymous member of a community, the community having a plurality of members, and the request specifying a first subject matter;
- determining whether there are available members of the community matching the first subject matter;
- in response to the receiving:
  - where there is at least one available community member matching the first subject matter, automatically determining a second user from among the determined available members based on a type of network connection of the second user to the community;
  - where there are no available community members matching the first subject matter;
    - determining when a member of the specific community becomes newly-available;
    - determining whether the newly-available member of the specific community matches the first subject matter and whether a type of network connection of the newly-available member is compatible with the request of the first user; and
    - where the newly-available member matches the first subject matter and the type of network connection of the newly-available member is compatible with the request, identifying the newly-available member as the second user; and
  - automatically establishing the collaborative session between the first user and the second user.

13. The method of claim 12, where available members are determined based on network presence of the members of the community.

14. The method of claim 12, where each available member has at least one associated network characteristic, and where the second user is determined based on the associated network characteristics of the available members.

15. The method of claim 12, further comprising:
receiving from the first user a request for a future collaborative session with a requested member of the community if there are no available members.

16. The method of claim 15, further comprising:
notifying the first user when the requested member of the community becomes available.

17. The method of claim 12, wherein the members have an associated identity, the method further comprising:
masking the identity of the second user from the first user.

18. The method of claim 12, wherein automatically determining the second user comprises automatically determining the second user based on a distribution of prior requests for collaborative sessions serviced by the available members.

19. The method of claim 12, where automatically determining the second user comprises determining the second user from among the available members based on a bandwidth rating associated with the second user.

20. The method of claim 12, further comprising identifying, based on a bandwidth rating associated with the first user, at least one collaboration feature from among a set of available collaboration features to include with the collaboration session.

21. The method of claim 18, where automatically determining the second user based on a distribution of prior requests comprises selecting the second user to maintain an even distribution of requests for collaborative sessions serviced by the available members.

22. The method of claim 12, wherein the type of network connection comprises a connection by mobile phone to the specific community.

23. The method of claim 12, wherein automatically establishing the collaborative session comprises:
- selecting collaboration session information based on the type of connection; and
- sending the selected collaboration session information to the first user and the second user.

* * * * *